No. 841,922. PATENTED JAN. 22, 1907.
W. G. BEATY.
HARROW.
APPLICATION FILED OCT. 13, 1906.
2 SHEETS—SHEET 2.
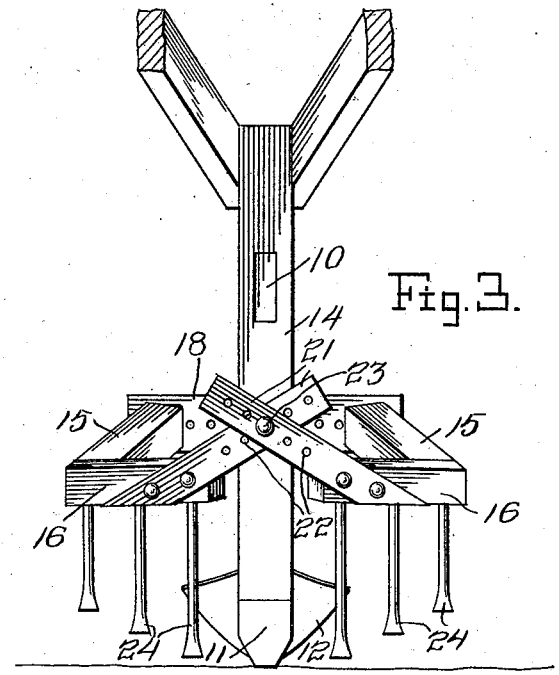
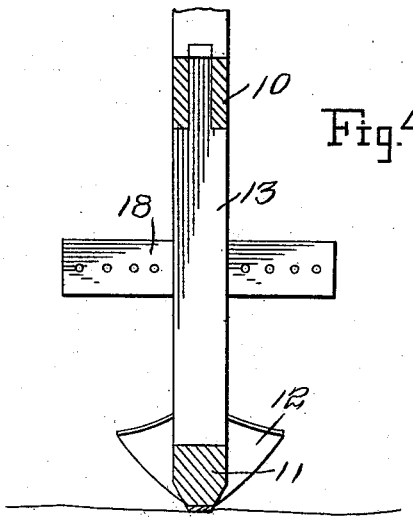

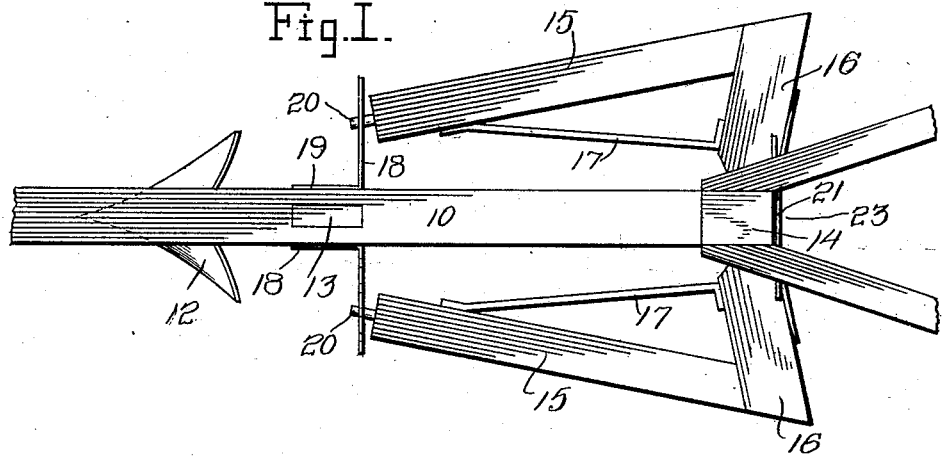
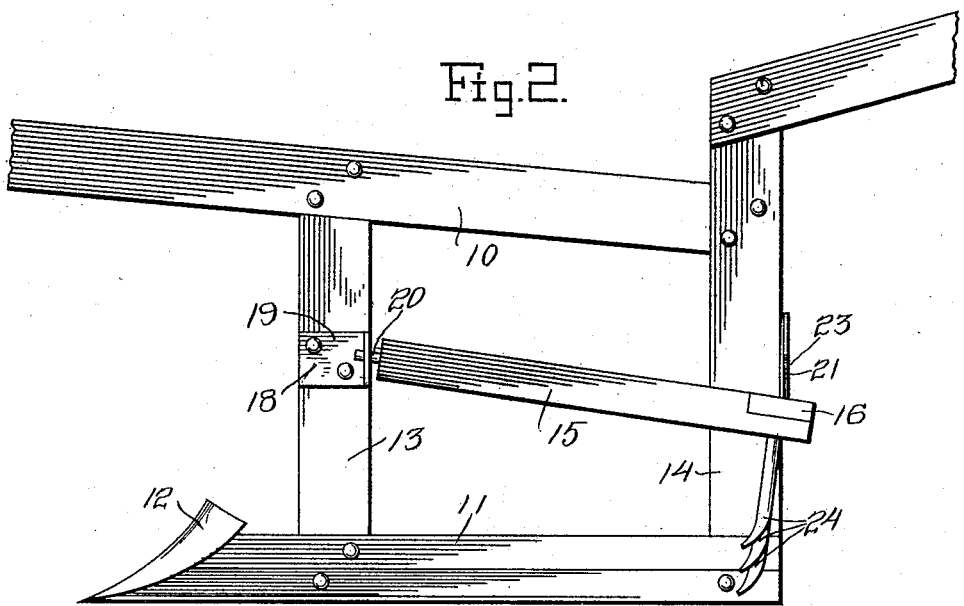

UNITED STATES PATENT OFFICE.

WARREN G. BEATY, OF DENMARK, TENNESSEE.

HARROW.

No. 841,922.  Specification of Letters Patent.  Patented Jan. 22, 1907.

Application filed October 13, 1906. Serial No. 338,745.

*To all whom it may concern:*

Be it known that I, WARREN G. BEATY, a citizen of the United States, residing at Denmark, in the county of Madison, State of Tennessee, have invented certain new and useful Improvements in Harrows; and I do hereby declare the following to be a full, clear, and exact description of the invention, such as will enable others skilled in the art to which it appertains to make and use the same.

This invention has relation to cultivators of the kind employing a plow centrally arranged and a harrow or cultivator on each side of the plow, the implement being designed as a whole for cultivating between two rows of corn, cotton, or other growing plants.

The implements are clearly portrayed in the annexed drawings, forming a part of this specification, in view of which they will first be described with respect to their construction and mode of operation and then be pointed out in the subjoined claims.

Of the said drawings, Figure 1 is a plan. Fig. 2 is a side elevation. Fig. 3 is a rear view. Fig. 4 is a transverse section in a plane in the rear of the front standard.

Similar numerals designate similar parts or features, as the case may be, wherever they occur.

In the drawings, 10 designates the plow-beam.

11 is the runner, extending substantially the full length of the implement, to the front end of which is secured a plow-point 12. The beam is connected with the runner by the front standard 13 and the rear standard 14, a portion of the latter projecting above the beam and adapted to assist in supporting the handle for controlling and guiding the device.

The cultivator-frames each consist of a side bar 15, extending from near the front standard rearwardly and obliquely outward and having a short transverse bar 16 tenoned at its outer end in a mortise formed in the rear end of bar 15. A brace 17 extends from the inner side of each transverse bar 16 to the inner side of the front end of the side bar 15.

A perforated strip of metal 18, having an angular end 19, is secured to each outer side of the front standard through the medium of said angular end, the perforated strips extending outward at right angles to the beam. A pin 20, connected with each side beam, extends forward from the forward end of the said side beam and is adapted to be passed through either of the several graduated perforations in the strip 18 to pivot the forward ends of said beams therein and to adjust them with respect to their nearness to and distance from the front standard and runner.

21 designates two strips of metal, one being secured to the rear side of one of the transverse bars 16 and extending inwardly and obliquely upward across the rear face of the rear standard and the other strip 21 being secured to the rearward face of the other transverse bar 16 and extending inwardly and upwardly in a direction similar to the first-mentioned strip and crossing the latter in the rear of the rear standard. The upper ends of the strips 21 are provided with a series of perforations 22, certain of which perforations are brought into alinement where the strips cross each other, and a bolt or screw 23, passed therethrough and into the rear of the rear standard, affords means for hinging the rear of the side frames on the rear standard, and by adjusting the bolt in different perforations 22 the side frames can be raised or lowered so as to work deeper or shallower in the ground, or the side frames can be hung up out of the way when the implement is being transferred from place to place and no harrowing is to be done.

The cultivator-teeth 24, which may be of any suitable form and number, are graduated in length, the outer teeth being shorter than the inner in order that all may work to the same depth in the ground.

The harrows may be separated from the beam, standards, and runner and connected and used alone as a drag, or the runner may be employed alone for planting delicate seeds by forming a furrow therefor. The side harrows are separate from the runner and its adjuncts.

What is claimed is—

1. The combination, with the beam, the two standards, and the runner, of the two side harrows, hingedly connected with the standards, and adjustable to narrower or wider work and to work deeper or shallower in the ground.

2. The combination, with the beam, the front and rear standards, the latter extending appreciably above the beam, and the runner, of the two side harrows, each provided with a row of teeth, and hingedly connected with the standards adjustable to narrower or wider work and to work deeper or shallower in the ground, and the teeth being graded as to length being longer at the inner side and shorter at the outer side.

3. The combination with the beam, the standards and the runner, of the side harrows, strips provided with a series of perforations secured to the front standard and extending laterally therefrom pins in the front ends of the side harrows adapted to be adjusted in either of the perforations of said strips, perforated strips secured to the rear ends of the side harrows and extending up obliquely therefrom and crossing each other on the rear face of the rear standard, and a bolt adapted to be passed through either of the perforations of the said two strips to secure them to the rear standard.

In testimony whereof I affix my signature in presence of two witnesses.

WARREN G. BEATY.

Witnesses:
F. A. BATCHELOR,
BENJ. TYSON.